United States Patent [19]
Magee

[11] 4,081,920
[45] Apr. 4, 1978

[54] FILM VIEWER

[76] Inventor: Raymond J. Magee, 335 Independence Dr., Forked River, N.J. 08731

[21] Appl. No.: 733,790
[22] Filed: Oct. 19, 1976
[51] Int. Cl.² .............................................. G03B 1/10
[52] U.S. Cl. ..................................... 40/362; 352/129
[58] Field of Search ................. 40/86 A, 86 R, 106.1, 40/31; 352/129

[56] References Cited
U.S. PATENT DOCUMENTS

| | | | |
|---|---|---|---|
| 1,559,665 | 11/1925 | Beery et al. | 40/86 R X |
| 2,502,178 | 3/1950 | Skupien | 40/86 A |
| 2,631,390 | 3/1953 | Dorogoff | 40/86 R |
| 3,229,397 | 1/1966 | Shaw | 40/86 A |
| 3,583,086 | 6/1971 | Fine | 40/86 R |

Primary Examiner—John F. Pitrelli
Attorney, Agent, or Firm—Robert K. Youtie

[57] ABSTRACT

A film viewer wherein a housing is provided with a viewing window, a film holder is removably positionable in the housing spaced from the window, and illuminating means provided in the housing for passing light through the film holder to the window.

1 Claim, 5 Drawing Figures

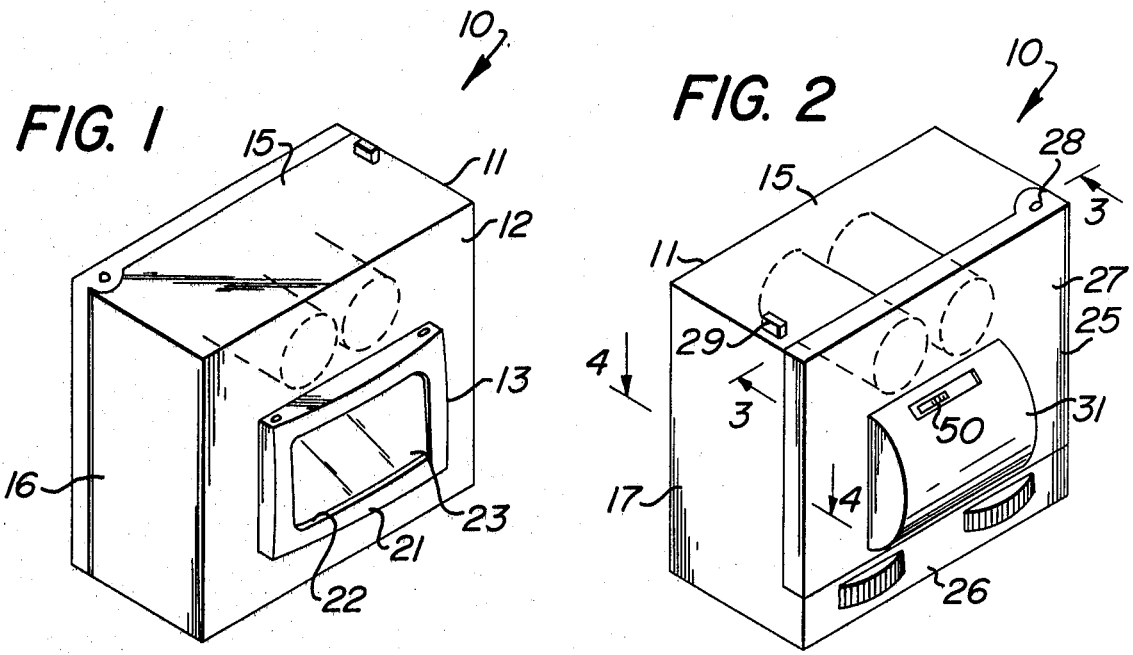
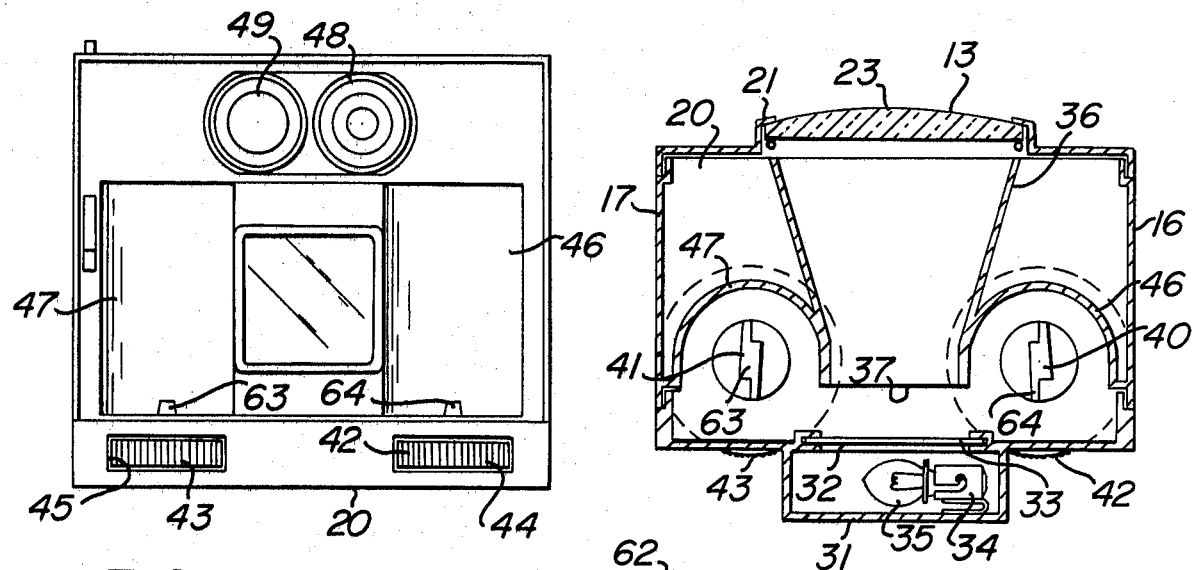
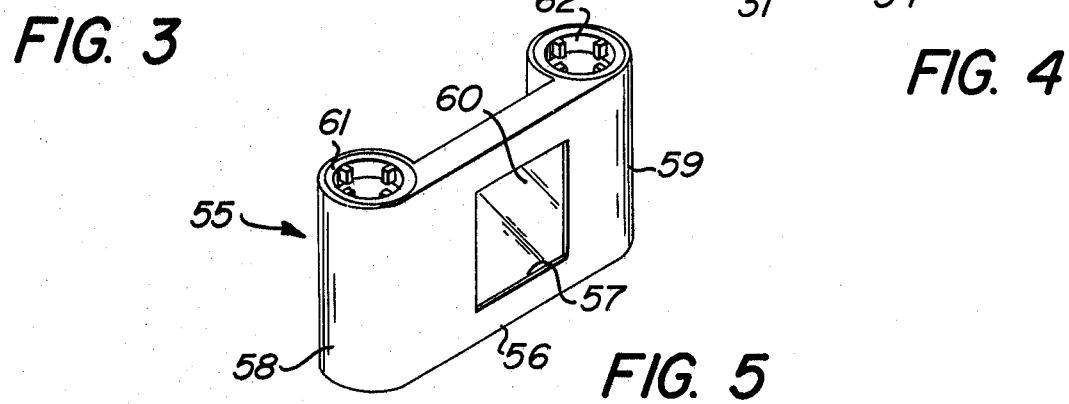

FILM VIEWER

BACKGROUND OF THE INVENTION

While there have, in the prior art, been proposed a variety of viewers for film transparencies, such prior devices have been relatively complex in structure and expensive in manufacture, as well as difficult to use, so as not to have found wide general acceptance.

SUMMARY OF THE INVENTION

It is, therefore, an important object of the present invention to provide a film viewer of the type described which is extremely simple in structure, capable of economic mass production for sale at a reasonable price, extremely easy to operate for use with roll of film or strips and capable of use even by small children without special training.

It is a further object of the present invention to provide a film viewer having the advantageous characteristics mentioned in the preceding paragraph, which effectively protects the film from damage in handling, effects substantial savings in cost of picture printing, and which affords improved viewing without environmental illumination.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a top, front perspective view showing a film viewer constructed in accordance with the teachings of the present invention.

FIG. 2 is a rear perspective view of the film viewer of FIG. 1.

FIG. 3 is a sectional elevational view taken generally along the line 3—3 of FIG. 2.

FIG. 4 is a horizontal sectional view taken generally along the line 4—4 of FIG. 2.

FIG. 5 is a perspective view showing a removable film cartridge for use in the instant film viewer.

DESCRIPTION OF THE PREFERRED EMBODIMENT

Referring now more particularly to the drawings, and specifically to FIGS. 1 and 2 thereof, a film viewer of the present invention is there generally designated 10, and may include an outer casing or housing 11 which may be of generally rectangular parallelopiped configuration.

More particularly, the housing 11 may include a generally rectangular front wall 12 provided generally centrally with a viewing window or visual access means 13. A generally rectangular top wall 15 extends rearwardly from the upper edge of front wall 13, and a pair of generally rectangular laterally spaced side walls 16 and 17 extend rearwardly from opposite side edges of the front wall and downwardly from opposite side edges of the top wall. In addition, a bottom wall 20 may be generally rectangular and extend rearwardly from the lower edge of front wall 12 between the lower edges of side walls 16 and 17. The structure thus far described, namely the front wall 12, and top, side and bottom walls 15, 16, 17 and 20 may all be integrally formed, as by molding of plastic, or may be of sectional construction, say as shown in FIG. 4. The viewing window 13 may be defined by a generally rectangular frame or bezel 21 bounding a central opening 22. Extending across the window opening 22, mounted within the frame or bezel 21, may be a light-permeable window element or lens 23, advantageously of magnifying characteristics.

Extending across the rear or back side of the housing 11 is a rear or back wall 25. The rear or back wall 25 may be sectional, including a lower section 26, being integral with the bottom wall 20 and side walls 16 and 17. More specifically, the lower back wall section 26 may upstand integrally from the rear edge of bottom wall 20 a short distance, and extend laterally between lower rear portions of respective side walls 16 and 17. The back wall 25 further includes a swingable upper section or door 27, suitably hinged or pivoted by pivot means 28 extending generally vertically along the side wall 16. The rear or back upper section 27 in its illustrated closed position may be generally flush with the lower back wall section 26, and is mounted for swinging movement away from the housing side wall 17 to afford access to the interior of the housing. Adjacent to the side wall 17, as projecting upwardly through the adjacent portion of top wall 15, there may be provided releasable latch means 29 for selective holding engagement with and releasing relation with respect to the swingable back section or door 27.

The swingable back section or door 27 may be formed with a rearwardly outward protrusion or bulge 31 which is generally in optical alignment with the viewing window 13 and opens, as at 32, toward the optical window. A light diffuser or panel 33 may extend across the opening 32, and a lamp socket 34 may be mounted in the protrusion 31 for removably holding a lamp 35. The diffuser panel 33 may be removable for access to the lamp 35 to remove and replace the latter.

Interiorly of the housing 11, generally in optical alignment between the front viewing window 13 and illuminating means or lamp 34, 35, there may be suitably mounted a rearwardly tapering light passageway 36. That is, the light passageway 36 tapers from its front end which is generally congruent to the front viewing window 13 toward and terminates at its rearward end 37 adjacent to and spaced forwardly from the illumination means 34, 35. The rear end 37 of light passageway 36 may be configured similarly to the diffused lighting panel 33.

Mounted in the rearward region of housing 11, on opposite sides of the light passageway 36, may be a pair of rotary drive wheels 40 and 41. That is, the drive wheels 40 and 41 are disposed generally horizontally with their axes in vertical parallelism with each other and mounted for axial rotation. The drive wheels 40 and 41 may each be provided with peripheral knurling, as at 42 and 43, and the lower rear wall section 26 is apertured, as at 44 and 45 for receiving respective wheels 40 and 41. That is, as best seen in FIGS. 2, 3 and 4, the knurled peripheries 42 and 43 of respective wheels 40 and 41 extend partially rearwardly through respective lower rear wall openings 44 and 45 for convenient manual access.

Internally of the housing 11, on each side of the light passageway 36, and generally coaxially with respective rotary drive wheels 40 and 41 are a pair of semicylindrical concavely rearwardly facing guide walls 46 and 47.

The semicylindrical upstanding guide walls 46 and 47 may each extend between the adjacent side of light passageway 36, and the adjacent side walls 16 and 17, respectively, see FIG. 4.

Also mounted in the housing 11 may be electrical energizing means or batteries 48 and 49 suitably electrically connected to lamp socket 34. An electric switch 50 may be provided, say on lamp bulge 31, for manually operating the lamp.

In FIG. 5 is shown a cartridge generally designated 55, which may include a generally rectangular medial holder 56 of a hollow, flat configuration, having light permeable window means 57. On opposite ends of the holder 56, are a pair of generally cylindrical spool casings 58 and 59 which communicate with the interior of the holder 56. Thus, the holder 56 is adapted to hold a film 60 generally flat in position extending across the opening 57, with the film ends extending from opposite sides of the holder into respective spool casings 58 and 59. Rotatably engaged in the spool casings 58 and 59 are respective spools or reels 61 and 62, having their ends toothed, as best seen in FIG. 5. The opposite end portions of film 60 may be wound on respective spools 61 and 62.

Upon opening of the swingable upper back wall section 27, upon release of catch or latch 29, the film cartridge 55 is engageable into the housing, with respective spool casings 58 and 59 entering into respective semicylindrical guides 47 and 46. This locates respective spools 61 and 62 in axial alignment with, over and in driven engagement with respect to respective rotary drive wheels 41 and 40. That is, the drive wheels 41 and 40 are each provided with a driving element, such as at 63 and 64, respectively, which may be of toothed or vaned configuration for interfitting engagement with a respective end of spools 61 and 62. This positioning of cartridge 55 locates the film holder 56 in position extending across the optical axis between illuminating means 35 and window 13, such that light is transmitted through the cartridge window 57 and film extending thereacross. Such illuminated film is thereby conveniently visible to an observer through the front window 13. When it is desired to change the picture being illuminated, it is only necessary to, by finger actuation, effect rotation of one or the other of finger wheels 40 or 41, to achieve film movement in a desired direction.

Of course, the cartridge 55 may be removed and another similar cartridge inserted, as desired, and the film moved between the cartridge spools and across the path of illumination, in the manner described hereinbefore.

From the foregoing it is seen that the present invention provides a film viewer which is extremely simple in construction and highly convenient in operation, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A film viewer comprising a housing front wall, a peripheral housing side wall extending about and rearwardly from said front wall, a housing rear wall swingably connected to and extending in closing relation with the rear of said side wall, a front viewing window in said housing front wall, a rear lamp in said housing carried by said rear wall and visually accessible through said viewing window, a generally flat film holder located in position between said window and lamp for illuminated presentation through said window, and rotary spools carried by said holder on opposite sides thereof for rotatably supporting coiled end portions of film extending through said holder, said holder and spools combining to define a film carrying cartridge removable and replaceable upon opening of said rear housing wall, whereby said spools are selectively wound and unwound for viewing a selected film portion, a pair of rotatable finger-actuable wheels mounted in said housing walls, and direct axial drive means on each of said wheels for direct axial interfitting engagement with respective spools and rotatable therewith, said wheels being at least partially exposed exteriorly of said housing walls for finger rotation to shift film in opposite directions in said holder, lens means on said window to facilitate viewing, said window and lens means being larger than said film holder, and a convergent light passageway extending between said lens means and holder, and internal guide walls within said housing side wall conformably engaging said cartridge to locate said spools in said direct axial interfitting engagement with said wheels.

* * * * *